Apr. 3, 1923.
R. W. ADAMS
RECIPROCATING POWER AIR PUMP
Filed Feb. 20, 1922
1,450,345
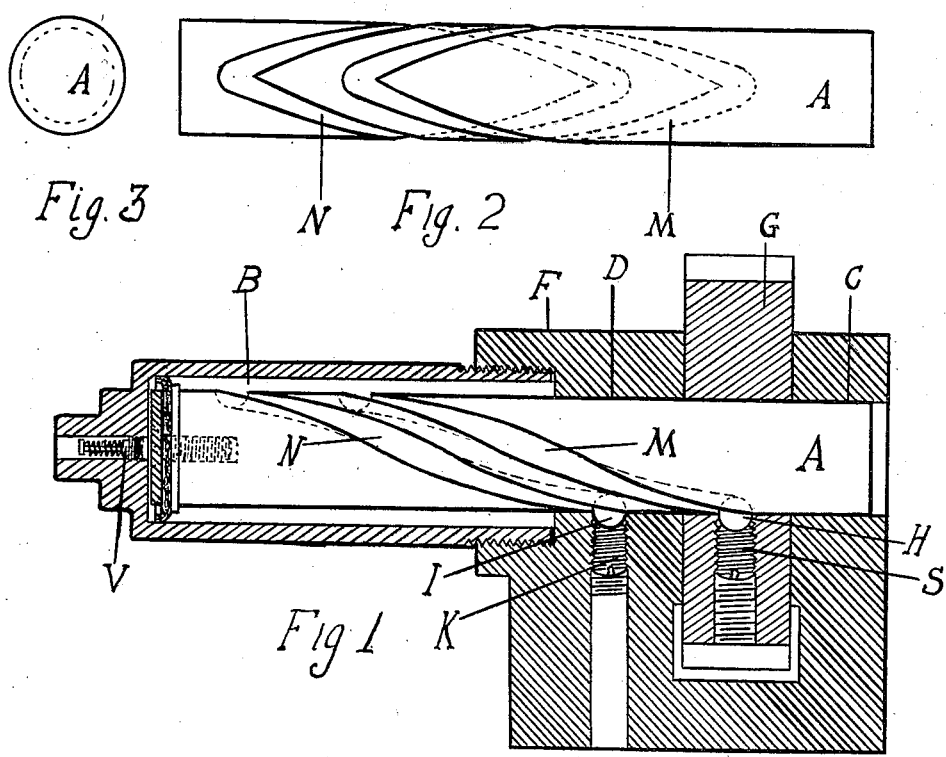
Inventor
Roy W. Adams Patented Apr. 3, 1923.

1,450,345

UNITED STATES PATENT OFFICE.

ROY W. ADAMS, OF NEW BRITAIN, CONNECTICUT.

RECIPROCATING POWER AIR PUMP.

Application filed February 20, 1922. Serial No. 538,045.

*To all whom it may concern:*

Be it known that I, ROY W. ADAMS, a citizen of the United States, residing at New Britain, in the county of Hartford and State of Connecticut, have invented certain new and useful Improvements in Reciprocating Power Air Pumps, of which the following is a specification.

The object of my invention is to provide a simple device for inflating automobile tires, which can be operated by connecting it to the power unit of an automobile, and to provide such a device, I have devised a simple, new, and efficient means of obtaining a reciprocating motion from a rotary motion and therein lies the novelty of my invention.

In the accompanying drawing:

Figure 1 is a cross-section of the entire pump as proposed;

Figure 2 is another view of the part A in Figure 1;

Figure 3 is an end view of part A in Figure 1.

The same letters are used to name the same parts in all three figures.

A, Fig. 1, is a plunger mounted in the casting F through the bearings at D and C and having at one end a leather piston which works in the cylinder B. G is a gear turning on plunger A as a shaft between bearings D and C.

Plunger A, as shown in Fig. 1 and Fig. 2, has two sets of spiral or helical grooves at M and N, each set consisting of a right hand and a left hand spiral or helix making a half turn around plunger A in opposite directions and terminating in each other at both ends. Thus M and N are two separate, similar, helical, continuous paths around plunger A.

H is a steel ball set in a reamed hole in gear G so that it protrudes from G into the groove M in plunger A. H is held in place by the screw S. I is a steel ball set in a reamed hole in the casting F at the bearing D so that I protrudes into the groove N in plunger A. I is held in place by screw K.

If gear G is revolved, ball H makes it necessary for plunger A to either revolve with G or to move, back and forth, (reciprocate), through the bearings D and C and the gear G enough to allow ball H to follow around the groove M. If plunger A is to revolve, ball I makes its necessary for A to reciprocate enough to allow ball I to follow around the groove N. The sets of grooves, M and N, are congruent and the same distance apart as the distance between the placements of balls H and I; the measurements being made parallel to the neutral axis of A. From the foregoing it can be seen that if gear G is revolved, plunger A will revolve and reciprocate; making one revolution and one complete reciprocation (back and forth) while gear G is making two revolutions. The balls H and I will follow around their respective grooves M and N in opposite ways, that is, while both have the same direction in a longitudinal sense, H will be in the left hand part of M while I is in a corresponding position of the right hand part of N and vice versa.

The piston at the end of plunger A will compress the air in cylinder B; forcing it out through valve V as in any ordinary hand air pump.

I claim:

In mechanism of the kind described the combination of a plunger which reciprocates and revolves and which contains two similar endless spiral grooves, a revolving member mounted on the plunger, a means of supporting the plunger on both sides of the revolving member, a member set in the revolving member and engaging one of the grooves in the plunger, a member set in the means of supporting the plunger and engaging the other groove in the plunger, substantially as set forth.

ROY W. ADAMS.